(12) United States Patent
Nakasone

(10) Patent No.: US 11,821,244 B2
(45) Date of Patent: Nov. 21, 2023

(54) LOCK DEVICE FOR OPENING/CLOSING BODY

(71) Applicant: PIOLAX, INC., Kanagawa (JP)

(72) Inventor: Hisashi Nakasone, Kanagawa (JP)

(73) Assignee: PIOLAX, INC., Kanagawa (JP)

( * ) Notice: Subject to any disclaimer, the term of this patent is extended or adjusted under 35 U.S.C. 154(b) by 287 days.

(21) Appl. No.: 17/285,286

(22) PCT Filed: Oct. 15, 2019

(86) PCT No.: PCT/JP2019/040410
§ 371 (c)(1),
(2) Date: Apr. 14, 2021

(87) PCT Pub. No.: WO2020/080342
PCT Pub. Date: Apr. 23, 2020

(65) Prior Publication Data
US 2021/0317690 A1    Oct. 14, 2021

(30) Foreign Application Priority Data

Oct. 18, 2018  (JP) .................................. 2018-196680

(51) Int. Cl.
*E05B 83/30* (2014.01)
*E05C 9/04* (2006.01)
*B60R 7/06* (2006.01)

(52) U.S. Cl.
CPC ................ *E05B 83/30* (2013.01); *E05C 9/04* (2013.01); *B60R 7/06* (2013.01); *E05C 9/047* (2013.01); *E05Y 2900/538* (2013.01)

(58) Field of Classification Search
CPC ........... Y10T 292/097; Y10T 292/0834; Y10T 292/0836; Y10T 292/084; Y10T 292/0846;

(Continued)

(56) References Cited

U.S. PATENT DOCUMENTS

| 7,455,333 | B2 * | 11/2008 | Ookawara | ............... E05B 83/30 |
| | | | | 292/34 |
| 2001/0016965 | A1 * | 8/2001 | Paton | .................... E05C 17/203 |
| | | | | 16/85 |

(Continued)

FOREIGN PATENT DOCUMENTS

| CN | 1944930 A | * | 4/2007 | ............. E05B 83/30 |
| CN | 105370115 A | * | 3/2016 | ............. E05B 77/36 |

(Continued)

OTHER PUBLICATIONS

Espacenet machine translation KR20180049406A Nov. 2016 (Year: 2023).*

(Continued)

*Primary Examiner* — Kristina R Fulton
*Assistant Examiner* — Steven A Tullia
(74) *Attorney, Agent, or Firm* — Paratus Law Group, PLLC

(57) ABSTRACT

A lock device for an opening and closing body attached to a fixed body, includes a rotary member includes a rotary shaft and a lock member connecting portion rotatably connected to a lock member. A rotary member attaching part includes an upright wall erected from a lock member arrangement surface, which is a surface of the opening and closing body or the fixed body facing the lock member, and a rotation support wall continuously provided to the upright wall and arranged spaced from the lock member arrangement surface, and is provided integrally with the opening and closing body or the fixed body. The rotation support wall is formed with a bearing hole in which the rotary shaft is inserted. A retainer preventing the rotary shaft inserted in the bearing hole from coming off is provided between the bearing hole and the rotary shaft.

6 Claims, 16 Drawing Sheets

(58) Field of Classification Search
CPC ......... Y10T 292/0969; Y10T 292/0977; E05C 9/04; E05C 9/047; E05C 9/00; E05B 83/30; E05B 15/04; B60R 7/06; E05Y 2900/538

See application file for complete search history.

(56) References Cited

U.S. PATENT DOCUMENTS

| | | | | |
|---|---|---|---|---|
| 2004/0051333 | A1* | 3/2004 | Brown | E05B 83/30 296/37.12 |
| 2004/0168487 | A1* | 9/2004 | Sawatani | B60R 7/06 70/145 |
| 2005/0104380 | A1* | 5/2005 | Cho | E05B 83/30 292/33 |
| 2006/0055196 | A1* | 3/2006 | Yamada | E05C 9/185 296/37.12 |
| 2011/0174027 | A1* | 7/2011 | Ookawara | E05C 9/047 70/159 |
| 2018/0251075 | A1* | 9/2018 | Harima | E05B 79/06 |
| 2018/0347241 | A1 | 12/2018 | Nakasone | |
| 2019/0234120 | A1* | 8/2019 | Flaute | E05B 83/30 |
| 2021/0301566 | A1* | 9/2021 | Takai | E05B 79/06 |

FOREIGN PATENT DOCUMENTS

| | | | | | |
|---|---|---|---|---|---|
| CN | 106062296 | A | * | 10/2016 | ............. E05B 83/30 |
| CN | 112814501 | A | * | 5/2021 | ............. E05B 79/22 |
| CN | 113585893 | A | * | 11/2021 | ............. E05B 83/30 |
| DE | 3301442 | A1 | * | 1/1983 | ............. E05B 79/20 |
| EP | 1273746 | A1 | * | 1/2003 | ............. B60R 7/06 |
| FR | 2448610 | A1 | * | 2/1979 | ............. E05B 63/248 |
| FR | 2936549 | A1 | * | 4/2010 | ............. E05B 83/30 |
| FR | 3107295 | A1 | * | 8/2021 | ............. B60R 7/06 |
| GB | 2540085 | A | * | 1/2017 | ............. B60R 7/06 |
| JP | 2006104771 | A | * | 4/2006 | |
| JP | 5698387 | B2 | | 4/2015 | |
| KR | 20040028192 | A | * | 2/2002 | ............. E05B 83/30 |
| KR | 20040054573 | A | * | 12/2003 | ............. E05B 83/30 |
| KR | 101212440 | B1 | * | 7/2011 | ............. E05B 83/30 |
| KR | 20150111619 | A | * | 3/2014 | ............. E05B 1/0038 |
| KR | 20180049406 | A | * | 11/2016 | ............. E05B 83/30 |
| WO | WO-2012029445 | A1 | * | 3/2012 | ............. E05B 83/30 |
| WO | WO-2012132546 | A1 | * | 10/2012 | ............. E05B 63/14 |
| WO | WO-2013018496 | A1 | * | 2/2013 | ............. E05B 13/10 |
| WO | WO-2013099601 | A1 | * | 7/2013 | ............. E05B 83/30 |
| WO | WO-2013105387 | A1 | * | 7/2013 | ............. E05B 77/36 |
| WO | WO-2013187388 | A1 | * | 12/2013 | ............. E05B 1/0038 |
| WO | WO-2015019571 | A1 | * | 2/2015 | ............. B60R 7/06 |
| WO | WO-2015125687 | A1 | * | 8/2015 | ............. B60R 7/06 |
| WO | WO-2017078121 | A1 | * | 5/2017 | ............. B60R 7/06 |
| WO | WO 2017/090545 | A1 | | 6/2017 | |
| WO | WO-2021062149 | A1 | * | 4/2021 | ............. E05B 81/06 |

OTHER PUBLICATIONS

Espacenet machine translation CN112814501A May 2021 (Year: 2023).*

Nov. 26, 2019, International Search Report issued for related PCT application No. PCT/JP2019/040410.

Nov. 26, 2019, International Search Opinion issued for related PCT application No. PCT/JP2019/040410.

* cited by examiner

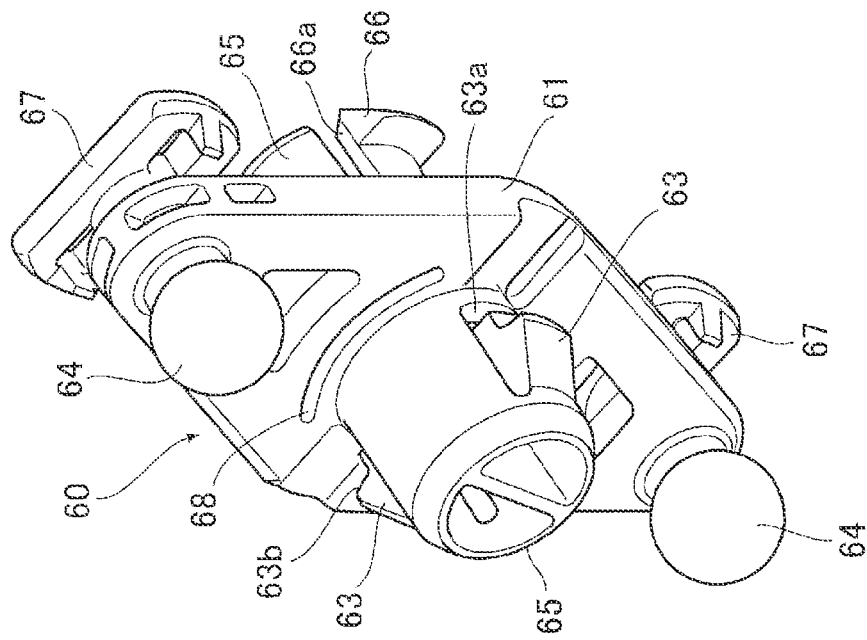
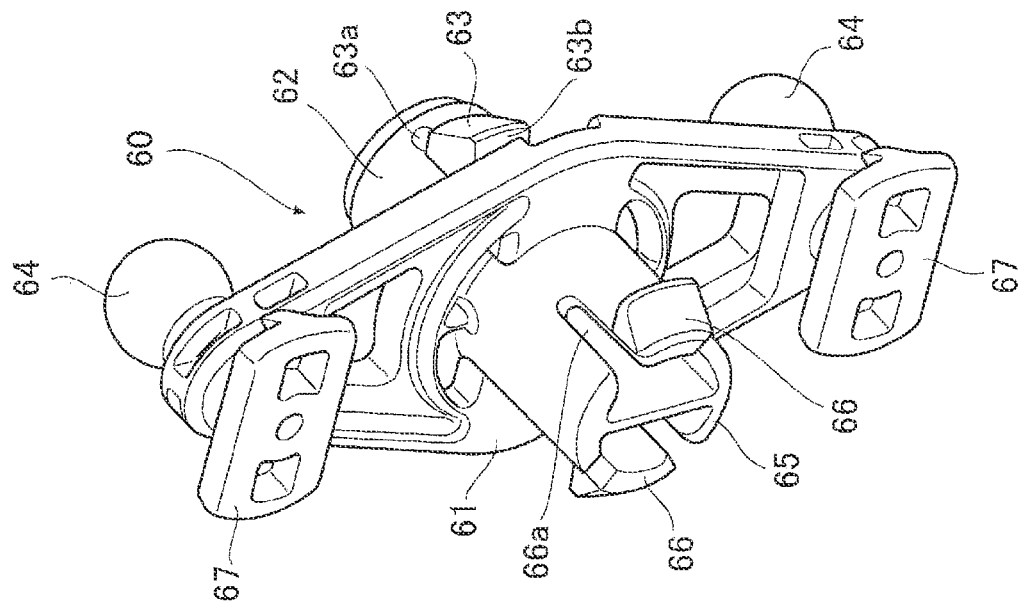

LOCK DEVICE FOR OPENING/CLOSING BODY

CROSS REFERENCE TO PRIOR APPLICATION

This application is a National Stage Patent Application of PCT International Patent Application No. PCT/JP2019/040410 (filed on Oct. 15, 2019) under 35 U.S.C. § 371, which claims priority to Japanese Patent Application No. 2018-196680 (filed on Oct. 18, 2018), which are all hereby incorporated by reference in their entirety.

TECHNICAL FIELD

The present invention relates to a lock device for an opening and closing body for locking, in a closed state, an opening and closing body that is attached to an opening portion of a fixed body in an openable and closable manner.

BACKGROUND ART

For example, an opening and closing body such as a lid is attached to an opening portion formed in a fixed body such as a glove compartment of an automobile, in an openable and closable manner. A lock device that is locked when the opening and closing body is closed and can be unlocked when opening the opening and closing body is provided between the opening portion and the opening and closing body.

As the lock device of the related art, PTL 1 discloses a lock device configured to open/close-lock a glove compartment attached to an opening portion of an instrument panel in an openable and closable manner, and including a rotor rotatably attached to the glove compartment-side, at least one lock pin that is slid in conjunction with rotation of the rotor and is inserted so as to be engageable/disengageable with respect to an engaging portion on the instrument panel-side, a torsion spring and a handle for rotating the rotor.

A boss-shaped rotor rotation shaft protrudes integrally with the glove compartment from a lock pin arrangement surface of the glove compartment. The rotor rotation shaft is inserted in a support hole of the rotor and is then screwed with a screw, so that the rotor is rotatably attached to the rotor rotation shaft. Note that, in the lock device, the rotor is directly screwed to the rotor rotation shaft protruding from the lock pin arrangement surface of the glove compartment. Therefore, the number of components is smaller, as compared to a configuration where the rotor is fixed via a separate member such as a bracket.

CITATION LIST

Patent Literature

PTL 1: Japanese Patent No. 5698387 B

SUMMARY OF INVENTION

Technical Problem

In the meantime, a slide direction of the lock pin is parallel to the lock pin arrangement surface of the glove compartment, in many cases. However, there is a desire to incline the slide direction of the lock pin with respect to the lock pin arrangement surface, depending on a position of the lock portion, and the like.

In this respect, in the lock device of PTL 1, the rotor is fixed to the rotor rotation shaft by the screw, and the rotor rotation shaft is provided integrally with the glove compartment. For this reason, a protrusion direction of the rotor rotation shaft with respect to the lock pin arrangement surface is determined by a demolding direction of the glove compartment during molding, and the slide direction of the lock pin is correspondingly regulated. Therefore, it is difficult to change the slide direction of the lock pin according to a shape of the instrument panel or the glove compartment.

It is therefore an object of the present invention to provide a lock device for an opening and closing body where it is possible to reduce the number of components and to easily adjust a slide direction of a lock member.

Solution to Problem

In order to achieve the above object, the present invention provides a lock device for an opening and closing body that is attached to an opening portion of a fixed body in an openable and closable manner, the lock device including a lock portion provided on the opening portion of the fixed body or the opening and closing body; a lock member slidably arranged to the opening and closing body or the fixed body and configured to be engaged with or disengaged from the lock portion; and a rotary member rotatably attached to the opening and closing body or the fixed body via a rotary member attaching part, wherein the rotary member includes a rotary shaft and a lock member connecting portion rotatably connected to the lock member, the rotary member attaching part includes an upright wall erected from a lock member arrangement surface, which is a surface of the opening and closing body or the fixed body facing the lock member, and a rotation support wall continuously provided to the upright wall and arranged spaced from the lock member arrangement surface by a predetermined distance, and is provided integrally with the opening and closing body or the fixed body, the rotation support wall is formed with a bearing hole in which the rotary shaft is inserted, and a retainer for preventing the rotary shaft inserted in the bearing hole from coming off is provided between the bearing hole and the rotary shaft.

Advantageous Effects of Invention

According to the present invention, the rotary member attaching part to which the rotary member is rotatably attached has the upright wall erected from the lock member arrangement surface of the opening and closing body or the fixed body, and the rotation support wall continuously provided to the upright wall and arranged spaced from the lock member arrangement surface by the predetermined distance, and is provided integrally with the opening and closing body or the fixed body. Therefore, it is possible to reduce the number of components, as compared to a configuration where the rotary member attaching part is fixed to the opening and closing body or the fixed body by a screw.

In addition, since the rotary member is rotatably supported by the rotation support wall arranged spaced from the lock member arrangement surface by the predetermined distance, when demolding a forming mold, it is possible to easily set an angle of the rotation support wall relative to the lock member arrangement surface to a desired angle, so that it is possible to easily adjust a slide direction (stroke direction) of the lock member connected to the lock member connecting portion of the rotary member.

BRIEF DESCRIPTION OF DRAWINGS

FIG. 9A is an enlarged perspective view of a rotary member of the lock device, and FIG. 9B is an enlarged perspective view thereof as seen in a direction different from FIG. 9A.

DESCRIPTION OF EMBODIMENTS

Hereinbelow, an embodiment of the lock device for an opening and closing body according to the present invention will be described.

Figure 1:
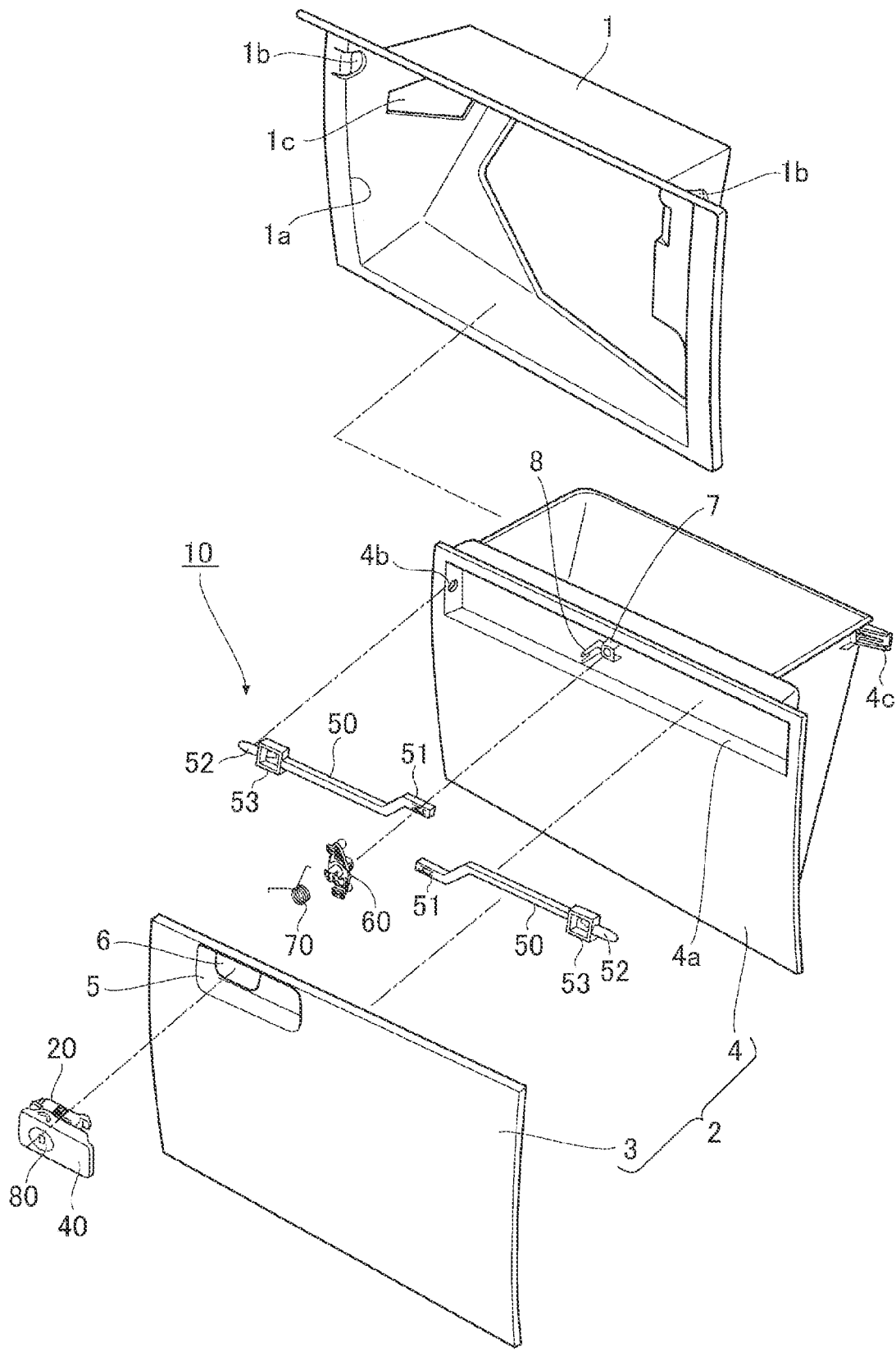
FIG. 1 is an exploded perspective view depicting an embodiment of the lock device for an opening and closing body of the present invention.

As shown in FIGS. 1 and 3, a lock device 10 for an opening and closing body (hereinbelow, referred to as "lock device 10") of the present embodiment is used, for example, for open/close-locking an opening and closing body 2 such as a glove compartment that is attached to an opening portion 1a of a fixed body 1 such as an instrument panel of a vehicle in an openable and closable manner.

As shown in FIG. 1, the lock device 10 of the present embodiment includes an attachment hole 6 formed in the opening and closing body 2, a pair of lock portions 1b and 1b provided to the opening portion 1a of the fixed body 1, a base member 20 inserted and attached from a front side of the attachment hole 6, a pair of lock members 50 and 50 slidably arranged with respect to the opening and closing body 2 and configured to be engaged with or disengaged from the lock portions 1b and 1b, a rotary member 60 rotatably attached to the opening and closing body 2 via a rotary member attaching part 90 (refer to FIG. 8) and configured to interlock slide operations of the pair of lock members 50 and 50, a first urging portion 70 for urging each lock member 50 in a direction of engaging with the lock portion 1b, and an operation member 40 having a base end portion 41, which is rotatably attached to the base member 20 via a rotation support portion 29, and configured to slide the lock members 50 by causing a gripping part 42 to come close to or to separate from the base member 20.

Note that, in the present embodiment, the attachment hole 6 is formed in the opening and closing body 2, and the lock members 50 are slidably arranged with respect to the opening and closing body 2. However, the attachment hole may be formed in the fixed body, and the lock members may be slidably arranged with respect to the fixed body-side.

Figure 5:
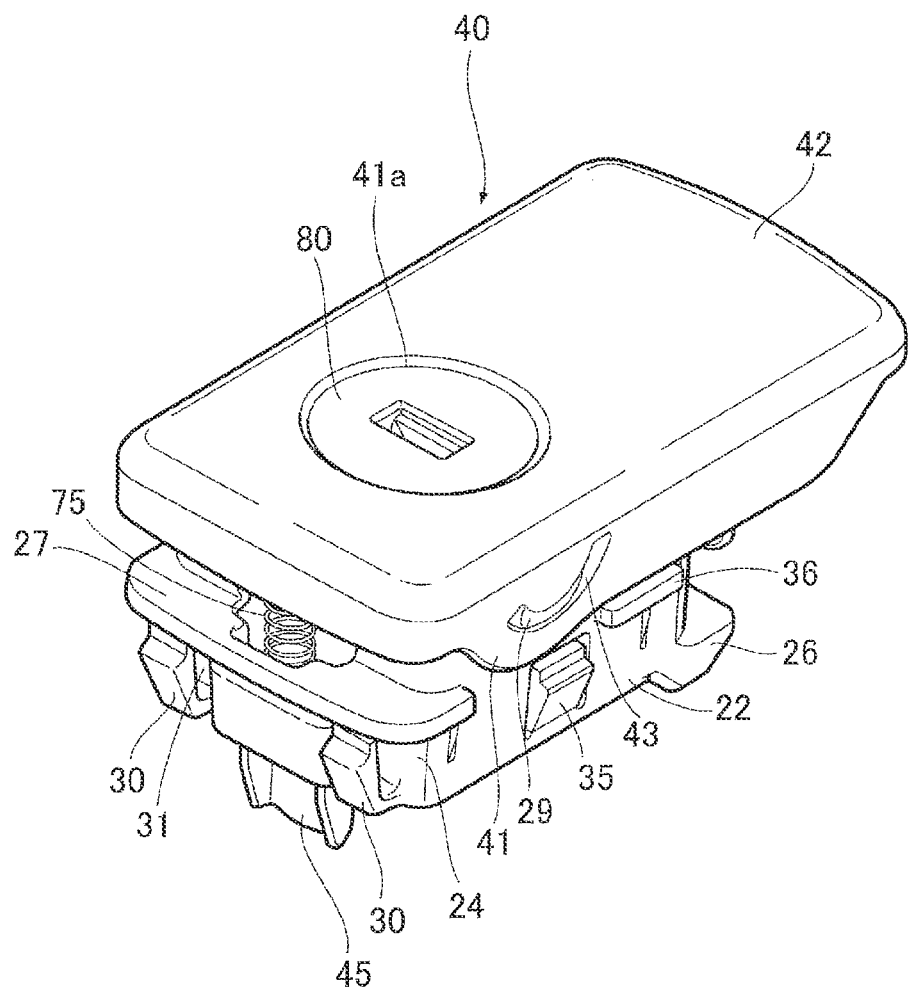
FIG. 5 is an enlarged perspective view depicting a state where the base member, the operation member and the like are attached in the lock device.

In addition, as shown in FIG. 5, a key cylinder 80 is arranged in the operation member 40, so that a locked state of the lock members 50 and 50 with respect to the lock portions 1b and 1b can be kept or released.

Figure 8:
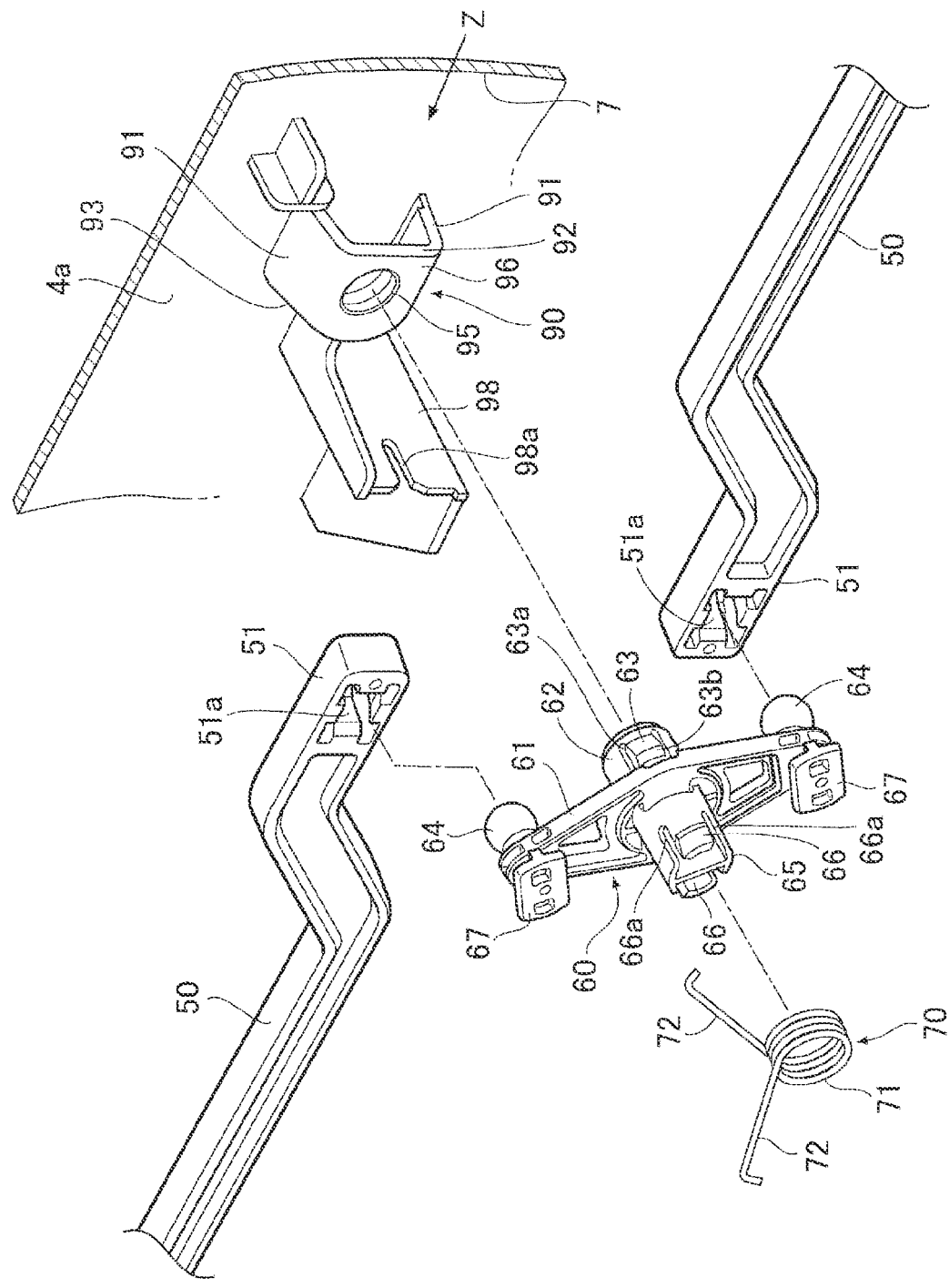
FIG. 8 is an exploded perspective view depicting a state before attaching a rotary member, a lock member and the like in the lock device.

Further, as shown in FIG. 8, in the present embodiment, the first urging portion 70 is a torsion spring, and has a wound portion 71 and a pair of arm portions 72 and 72 extending from the wound portion 71. The first urging portion 70 corresponds to the "urging portion" of the present invention. The first urging portion 70 is mounted to the rotary member 60 and rotationally urges the same to urge the lock members 50 connected to the rotary member 60 in a direction of engaging with the lock portions 1b (refer to FIG. 15). However, the first urging portion may be, for example, a tension spring that pulls one side of the lock member toward the lock portion and can urge the lock member in a direction of engaging with the lock portion.

Note that, as described above, the present embodiment is applied to, for example, a structure where the box-shaped glove compartment is rotatably attached to the opening portion of the instrument panel (in this case, the instrument panel is the "fixed body" and the glove compartment is the "opening and closing body") but may also be applied to a structure where a lid is attached to the opening portion of the instrument panel in an openable and closable manner (in this case, the instrument panel is the "fixed body", and the lid is the "opening and closing body") and can also be widely used for a variety of opening and closing bodies for opening and closing the opening portion of the fixed body.

Figure 13:
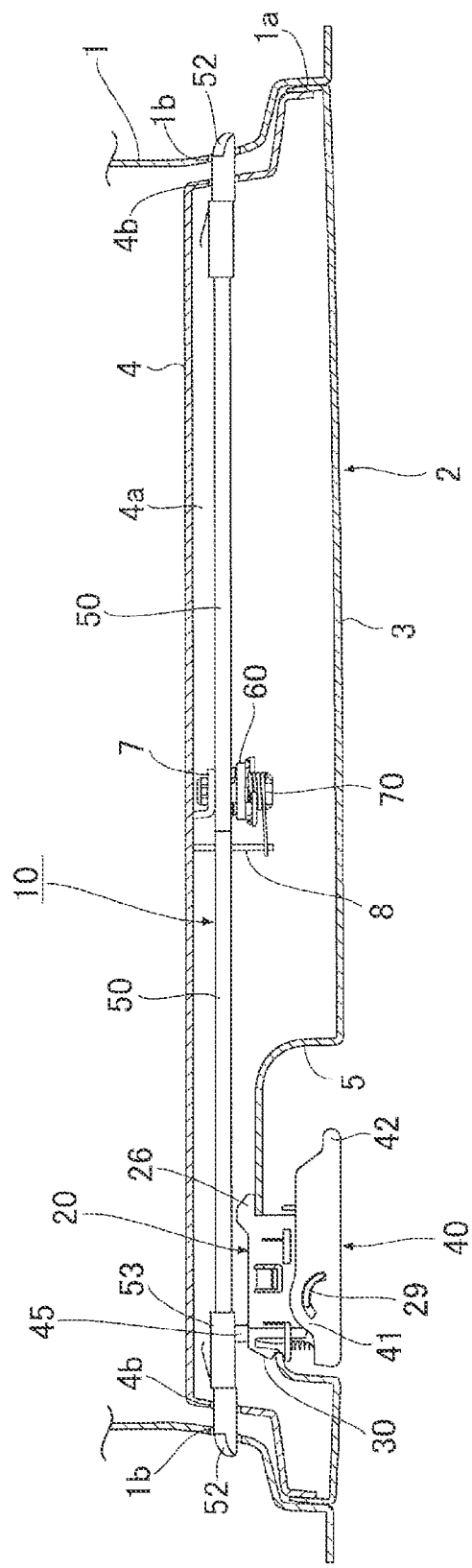
FIG. 13 is a plan view depicting a case where the opening and closing body is locked in a closed state in the lock device.

As shown in FIGS. 1 and 13, in the present embodiment, the lock portions 1b and 1b each having a hole shape are provided on both inner surfaces of the opening portion 1a of the fixed body 1 in a width direction. Both side parts of the opening portion 1a of the fixed body 1 are formed with guide grooves 1c and 1c (refer to FIG. 1). Note that, the lock portion may have a concave shape, a protrusion shape, a frame shape or the like, instead of the hole shape, and may also be provided to the opening and closing body, not the opening portion of the fixed body. That is, the lock portion is not particularly limited.

Figure 6:
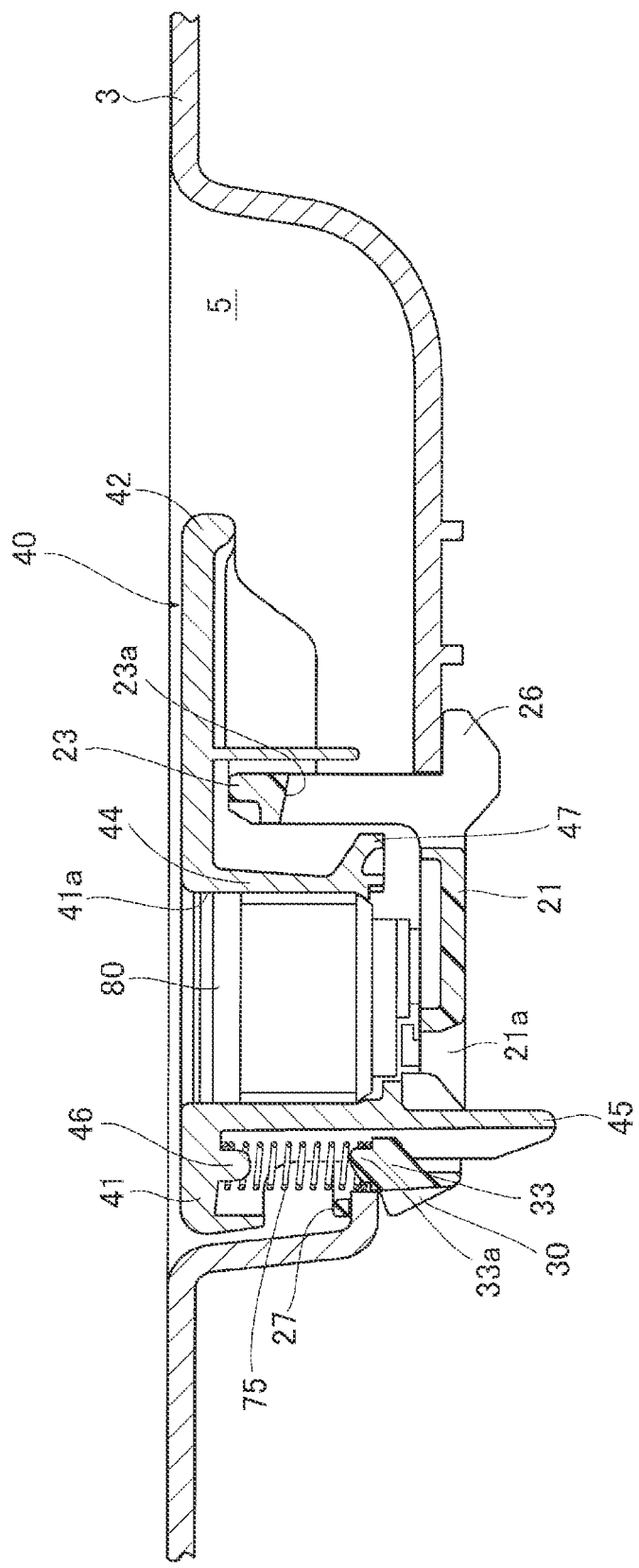
FIG. 6 is a sectional view depicting a state where the base member and the operation member are arranged in a concave portion for accommodation.
Figure 7:
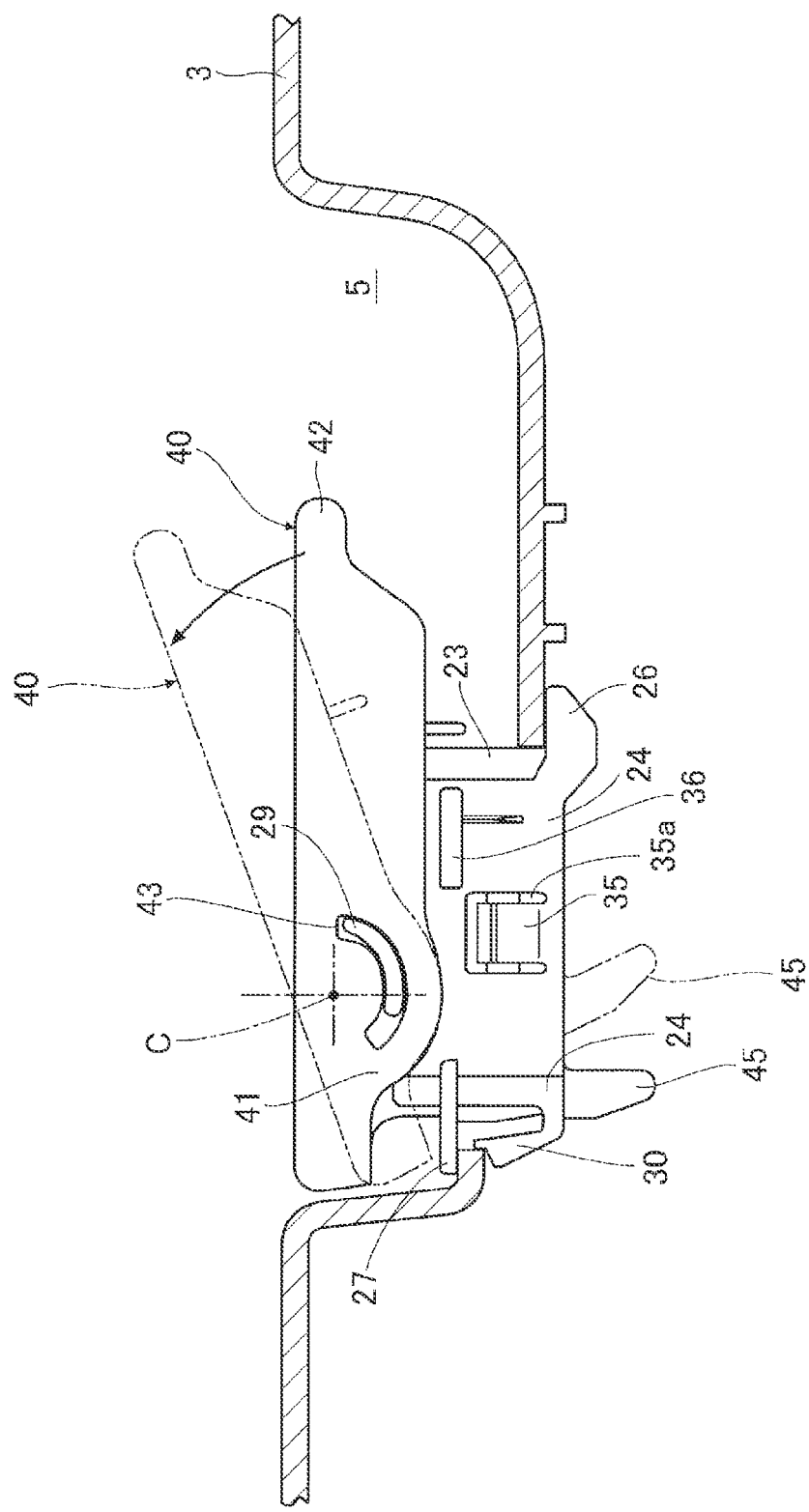
FIG. 7 is a sectional view depicting a rotating state of the operation member in the lock device.

As shown in FIG. 1, in the present embodiment, the opening and closing body 2 is constituted by an outer member 3 arranged on a vehicle interior inner side and an inner member 4 arranged on a rear side thereof. Note that, the opening and closing body may also be constituted by one plate, not the two members of the outer member 3 and the inner member 4. A concave portion 5 for accommodation having a horizontally long rectangular shape is formed above one side of the outer member 3 in the width direction. As shown in FIGS. 6 and 7, the operation member 40 is accommodated in the concave portion 5 for accommodation.

One side part of the concave portion 5 for accommodation in a longitudinal direction is formed with an attachment hole 6 having a long hole shape and extending in the width direction of the opening and closing body 2 (refer to FIG. 1). Note that, the attachment hole may not have the long hole shape, and may be a hole having a substantially square shape, a hole having a substantially elliptical shape, a hole having a substantially oval shape, or the like, for example.

The base member 20 is inserted and attached from the front side of the attachment hole 6. As used herein, the "front side" or the "front surface side" means a surface located in a direction in which the opening and closing body i65s opened from the opening portion of the fixed body such as a vehicle. Note that, in a case where the fixed body is provided in a vehicle, a space side in the vehicle may be the "front side" or the "front surface side". The "rear side" or the "rear surface side" means a surface opposite to the "front side" or the "front surface side", i.e., a surface located in a direction in which the opening and closing body is closed. Note that, the "front side", the "front surface side", the "rear side" and the "rear surface side" have the similar meanings not only for the attachment hole but also for other members (the operation member 40 and the like) to be described later.

Figure 14:
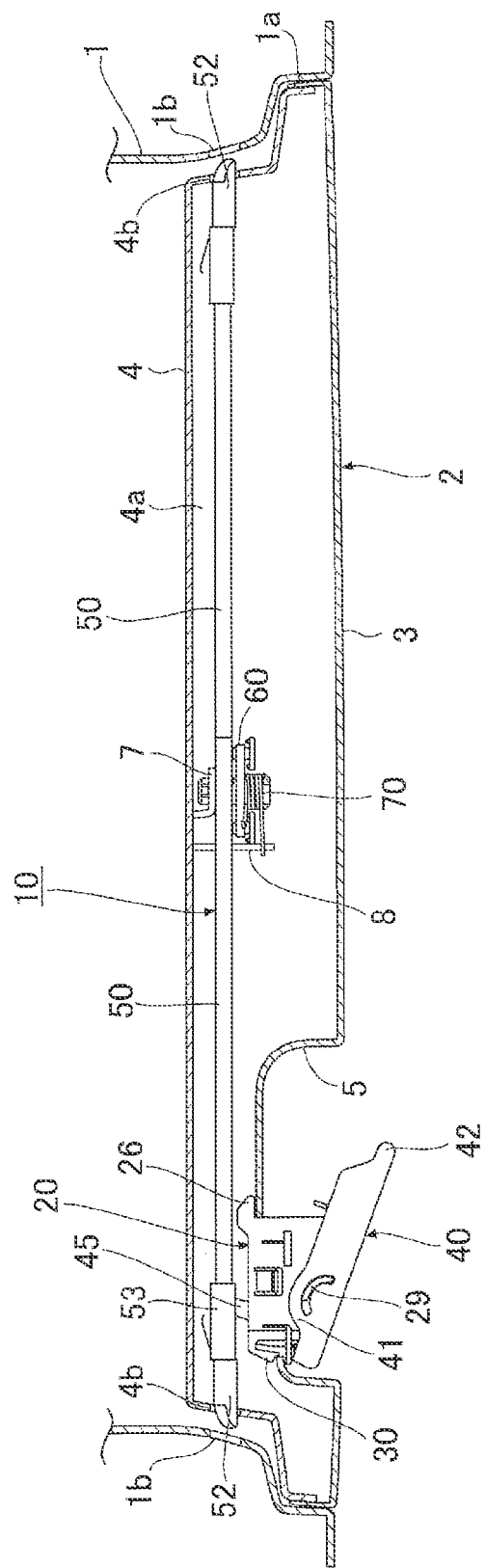
FIG. 14 is a plan view depicting a case where a locked state of the opening and closing body is released in the lock device.

As shown in FIG. 1, the inner member 4 has a box shape that is opened upward, as a whole. An upper part of a front surface side of the inner member 4 arranged to face the outer member 3 is provided with a concave portion 4a for lock arrangement having a horizontally long concave shape and configured to slidably arrange the pair of lock members 50 and 50. As shown in FIGS. 13 and 14, both sides of the concave portion 4a for lock arrangement in the longitudinal direction are each formed with each of holes 4b and 4b for lock insertion and extraction. Also, as shown in FIG. 1, stoppers 4c and 4c protrude from both side outer surfaces of an inner side of the inner member 4. The stoppers 4c and 4c are each inserted in the guide grooves 1c and 1c of the fixed body 1, so that an opening/closing angle of the opening and closing body 2 with respect to the opening portion 1a of the fixed body 1 is regulated.

Also, as shown in FIG. 1, the pair of lock members 50 and 50 of the present embodiment has the same shape where a base end portion 51-side is bent in a crank shape and extends linearly toward a tip end-side and a tip end portion 52 is adapted to engage with or disengage from the lock portion 1b (refer to FIGS. 14 to 17). Note that, as shown in FIG. 8, the base end portion 51 of the lock member 50 is provided with a concave portion 51a for fitting having a concave shape and a lock member connecting portion 64 of the rotary member 60, which will be described later, is fitted in the concave portion 51a for fitting. A tip end-side of the lock member 50 is provided with a frame-shaped part 53 having a rectangular frame shape.

Note that, the lock member may have a straightly extending shape, for example, and a shape, a structure and the like thereof are not particularly limited as long as it has a part to engage with the lock portion.

Figure 2:
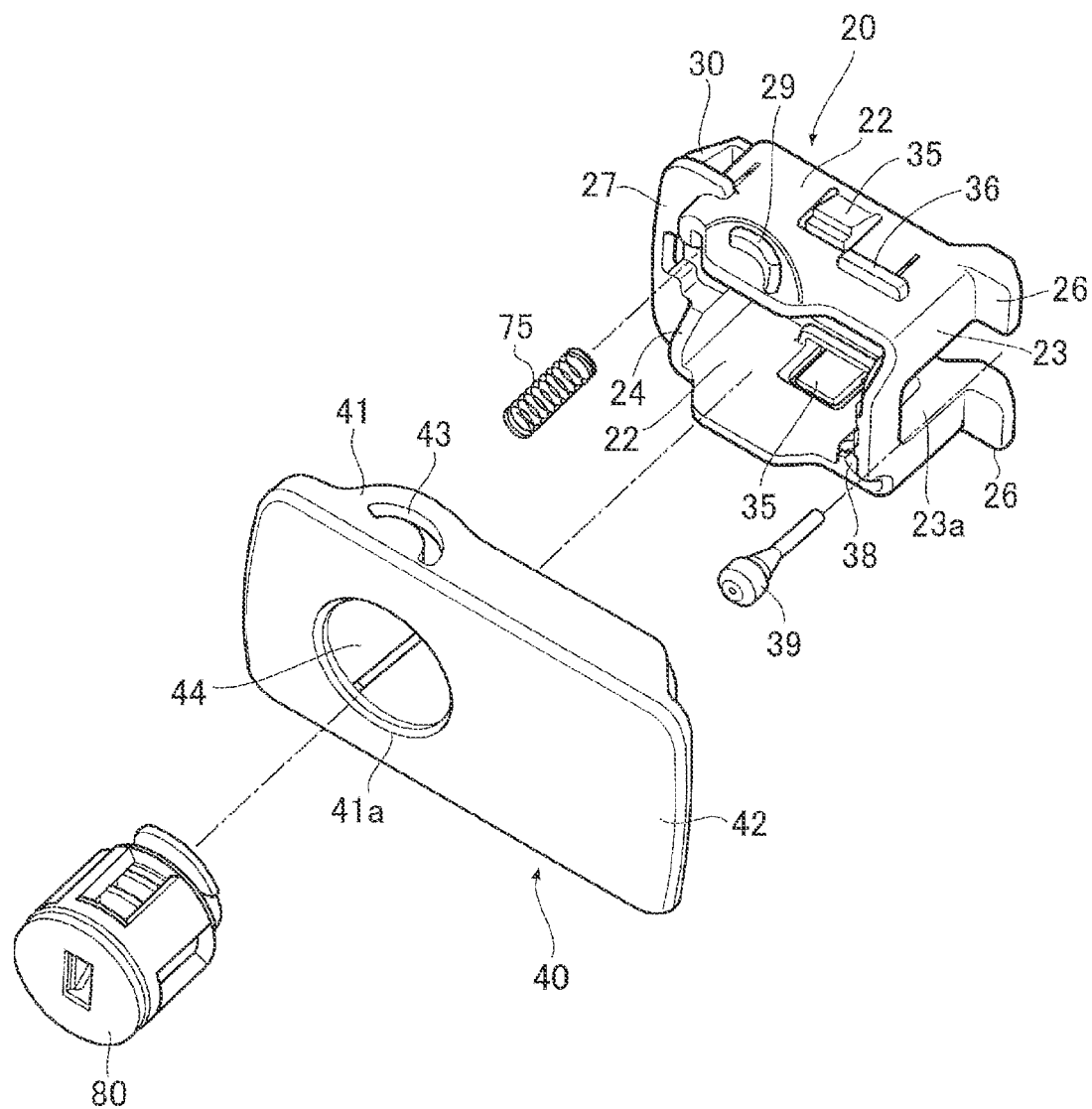
FIG. 2 is an exploded perspective view depicting a state before attaching a base member, an operation member and the like in the lock device.

In the present embodiment, as shown in FIGS. 2 and 3, the base member 20 that is inserted and attached from the front side of the attachment hole 6 has a substantially elongated box shape having a bottom wall 21 having an elongated plate shape that is long in one direction, a pair of sidewalls 22 and 22 erected from peripheral edges of both sides along long sides of the bottom wall 21, one end wall 23 arranged on one end-side of the bottom wall 21 in the longitudinal direction and connecting the pair of sidewalls 22 and 22 each other, and the other end wall 24 arranged on the other end-side of the bottom wall 21 in the longitudinal direction and connecting the pair of sidewalls 22 and 22 each other, where an upper side opposite to the bottom wall 21 is opened and an internal space 25 is defined therein.

The bottom wall 21 is formed with a slide groove 21a configured to slidably accommodate an operating lever 45 (which will be described later) of the operation member 40 and to communicate with the internal space 25. The one end wall 23 is formed with an opening portion 23a configured to communicate with the internal space 25.

Note that, one end of the bottom wall 21 in the longitudinal direction is arranged in the same direction as one end of the attachment hole 6 in the longitudinal direction, and the other end of the bottom wall 21 in the longitudinal direction is arranged in the same direction as the other end of the attachment hole 6 in the longitudinal direction.

A pair of hooks 26 and 26 configured to engage with a rear peripheral edge of one end of the attachment hole 6 in the longitudinal direction protrudes from both sides of the bottom wall 21-side of the one end wall 23 in the width direction (a direction orthogonal to the longitudinal direction). A thin flange-shaped wall part 27 arranged to face the other end-side of the attachment hole 6 protrudes from a predetermined height position of an outer periphery of the other end wall 24 of the base member 20 toward an outside of the base member. A rotation support portion 29 having a substantially circular arc protrusion shape and configured to rotationally support the base end portion 41 of the operation member 40 protrudes from an outer surface above each of the pair of sidewalls 22 and 22 and close to the other end wall 24. Both sides of the other end wall 24 in the width direction are provided with a pair of elastically deformable elastic engaging claws 30 and 30 configured to engage with the rear peripheral edge of the attachment hole 6.

Figure 3A:
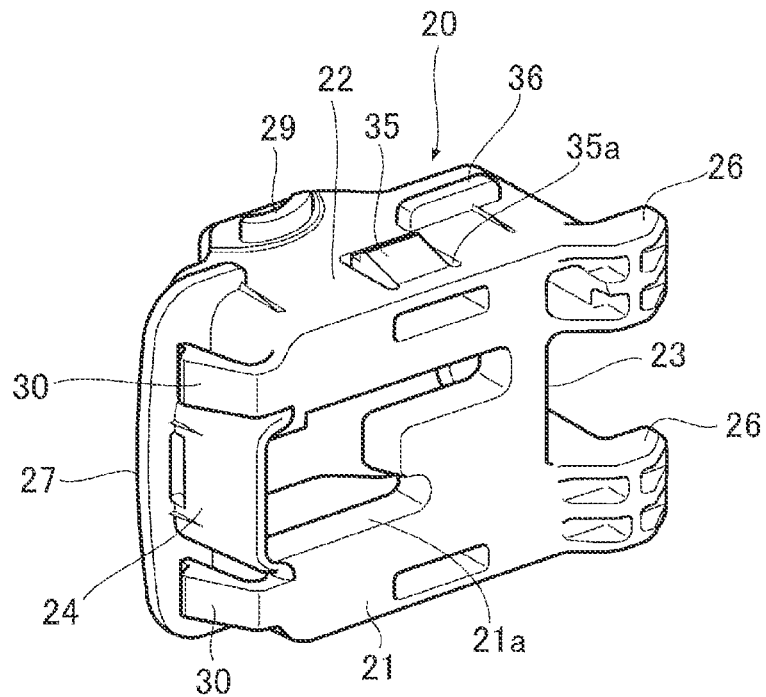
FIG. 3A is an enlarged perspective view of the base member.
Figure 3B:
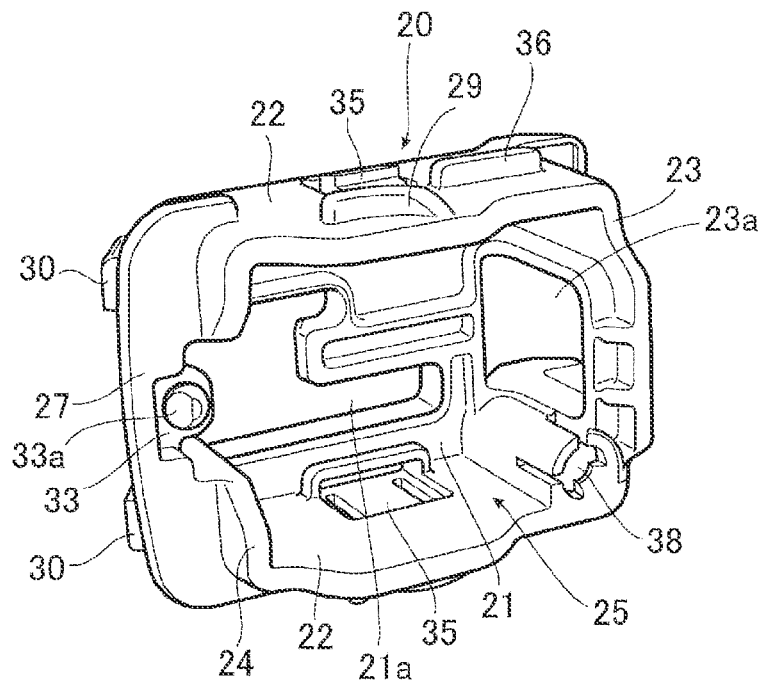
FIG. 3B is an enlarged perspective view of the base member, as seen in a direction different from FIG. 3A.

As shown in FIG. 3B, a second spring support portion 33 is provided at a center of the other end wall 24-side in the width direction. A spring support protrusion 33a for supporting the other end of a second urging portion 75 protrudes from a surface (a surface facing the operation member 40) of the second spring support portion 33.

As shown in FIG. 6, the other end of the second urging portion 75 is supported by the spring support protrusion 33a on the base member 20-side and one end of the second urging portion 75 is supported by a spring support protrusion 46 (which will be described later) of the operation member 40, so that the second urging portion is kept compressed between both the members and the base end portion 41-side of the operation member 40 is rotationally urged in a direction of separating from the base member 20. For this reason, as shown with the dashed-two dotted line in FIG. 7, when the gripping part 42 of the operation member 40 is rotated in a direction of separating from the base member 20 and a hand is then detached from the gripping part 42, the gripping part 42 is urged toward the base member 20 and is held not to protrude from the concave portion 5 for accommodation.

As shown in FIGS. 3A and 7, flexible elastic engaging pieces 35 and 35 are formed via U-shaped slits 35a on a further one end wall 23-side than the rotation support portions 29 and 29 on outer surfaces of the sidewalls 22 and 22 of the base member 20. In addition, ribs 36 and 36 protrude at positions close to the elastic engaging pieces 35 and 35 on the outer surfaces of the sidewalls 22 and 22 close to one end wall 23. The pair of elastic engaging pieces 35 and 35 is engaged with the rear peripheral edges of both side parts of the attachment hole 6 in the longitudinal direction, and the pair of ribs 36 and 36 is engaged with the front peripheral edges of both side parts of the attachment hole 6.

As shown in FIG. 3B, a damper mounting hole 38 is formed at a corner portion on one end-side of the base member 20. As shown in FIG. 2, a rubber damper 39 is mounted to the damper mounting hole 38, so that a hitting sound is reduced when the operation member 40 rotates.

Figure 4:
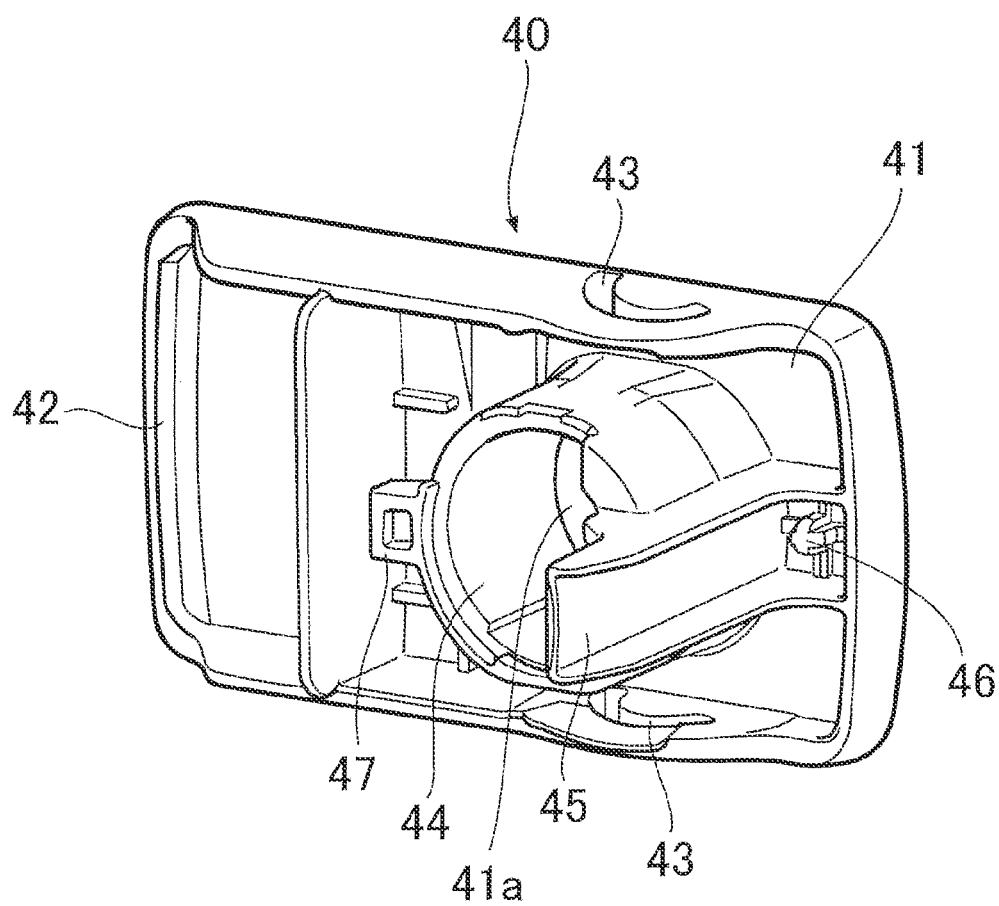
FIG. 4 is an enlarged perspective view of the operation member.

In the present embodiment, as shown in FIGS. 4 and 5, the operation member 40 that is rotatably attached to the base member 20 via the rotation support portions 29 and 29 has an elongated shape that is long in one direction as a whole. The operation member 40 has the base end portion 41 that is rotatably supported to the rotation support portions 29 of the base member 20, and a gripping part 42 that is provided at a tip end portion in the longitudinal direction and is gripped by an operator when rotationally operating the operation member 40. Both sides (both sides in the width direction orthogonal to the longitudinal direction) of the base end portion 41 are formed with groove portions 43 and 43 each having a substantially circular arc groove shape. The circular arc protrusion-shaped rotation support portions 29 and 29 of the base member 20 are each inserted into the groove portions 43 and 43, so that the base end portion 41 of the operation member 40 is rotatably supported via the rotation support portions 29.

As shown in FIG. 7, the operation member 40 is configured so that the gripping part 42 on the tip end portion-side can be rotated away from or toward the base member 20 about the base end portion 41 as a support point rotationally supported to the rotation support portions 29 of the base member 20.

As shown in FIG. 2, a circular cylinder insertion hole 41a is formed at a position close to the base end portion 41 of the operation member 40, and a cylinder arranging tube 44 having a cylindrical shape protrudes from a peripheral edge of a rear surface of the cylinder insertion hole, so that a well-known key cylinder 80 can be inserted and fixed.

Figure 15:
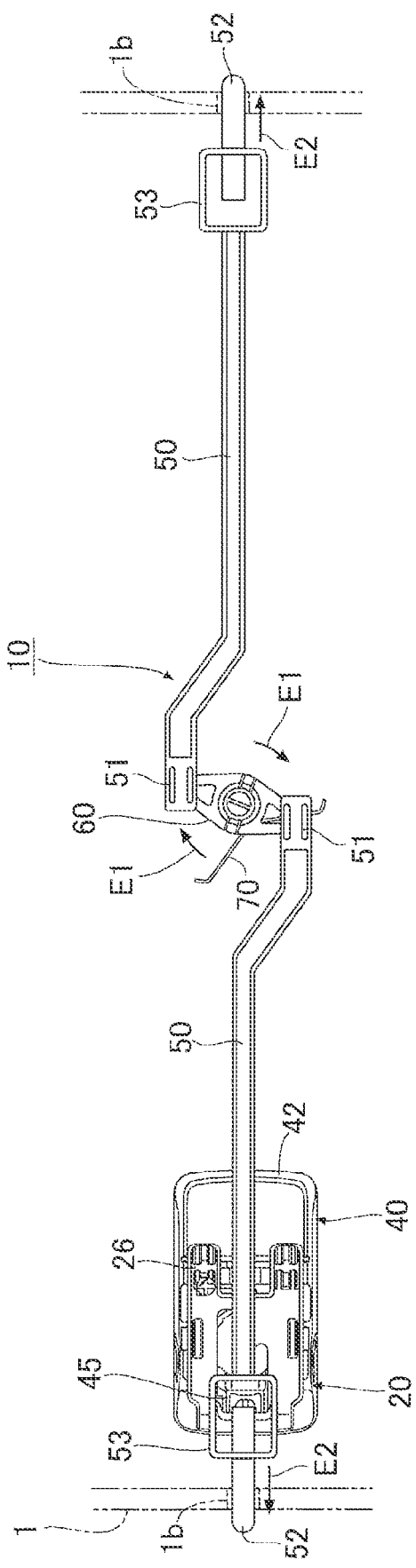
FIG. 15 is a front view depicting the case where the opening and closing body is locked in the closed state in the lock device.

As shown in FIG. 4, an operating lever 45 that causes the tip end portion 52 of the lock member 50 to slide in a direction of not engaging with the lock portion 1b of the fixed body 1 when the gripping part 42 of the operation member 40 rotates in a direction of separating from the base member 20 protrudes from a position close to the cylinder arranging tube 44 on the rear surface of the base end portion 41-side of the operation member 40. The operating lever 45 has a substantially U-shaped frame shape in a cross section and extends by a predetermined length. Note that, the operating lever 45 is inserted in the internal space 25 of the base member 20 and is inserted into the slide groove 21a formed in the bottom wall 21, so that it can slide in the slide groove 21a along the longitudinal direction of the base member 20. A tip end portion of the operating lever 45 in the extension direction is inserted from the slide groove 21a and enters the frame-shaped part 53 of one lock member 50, as shown in FIG. 15.

As shown in FIG. 4, a spring support protrusion 46 for supporting one end of the second urging portion 75 that is a coil spring protrudes from the furthest base end of the rear surface side of the base end portion 41 of the operation member 40. Also, as shown in FIG. 4, a stopper protrusion 47 protrudes from an opening peripheral edge portion of the cylinder arranging tube 44 on an opposite side to the operating lever 45. When the gripping part 42 of the operation member 40 is rotated in a direction of separating from the base member 20, the stopper protrusion 47 comes into contact with the opening portion 23a (refer to FIG. 3B) provided to one end wall 23 of the base member 20, thereby regulating a rotating angle of the gripping part.

Note that, examples of the operation member may include, for example, a rotary knob or a rotary handle configured to rotate along a plane direction of the opening and closing body or the fixed body or a push type configured to be pressed with respect to the plane direction, and the structure of the operation member is not particularly limited as long as the lock member can be engaged with or disengaged from the lock portion. The operation member may also be attached to the fixed body-side.

Subsequently, the rotary member attaching part 90 for rotatably attaching the rotary member 60 is described.

Figure 11:
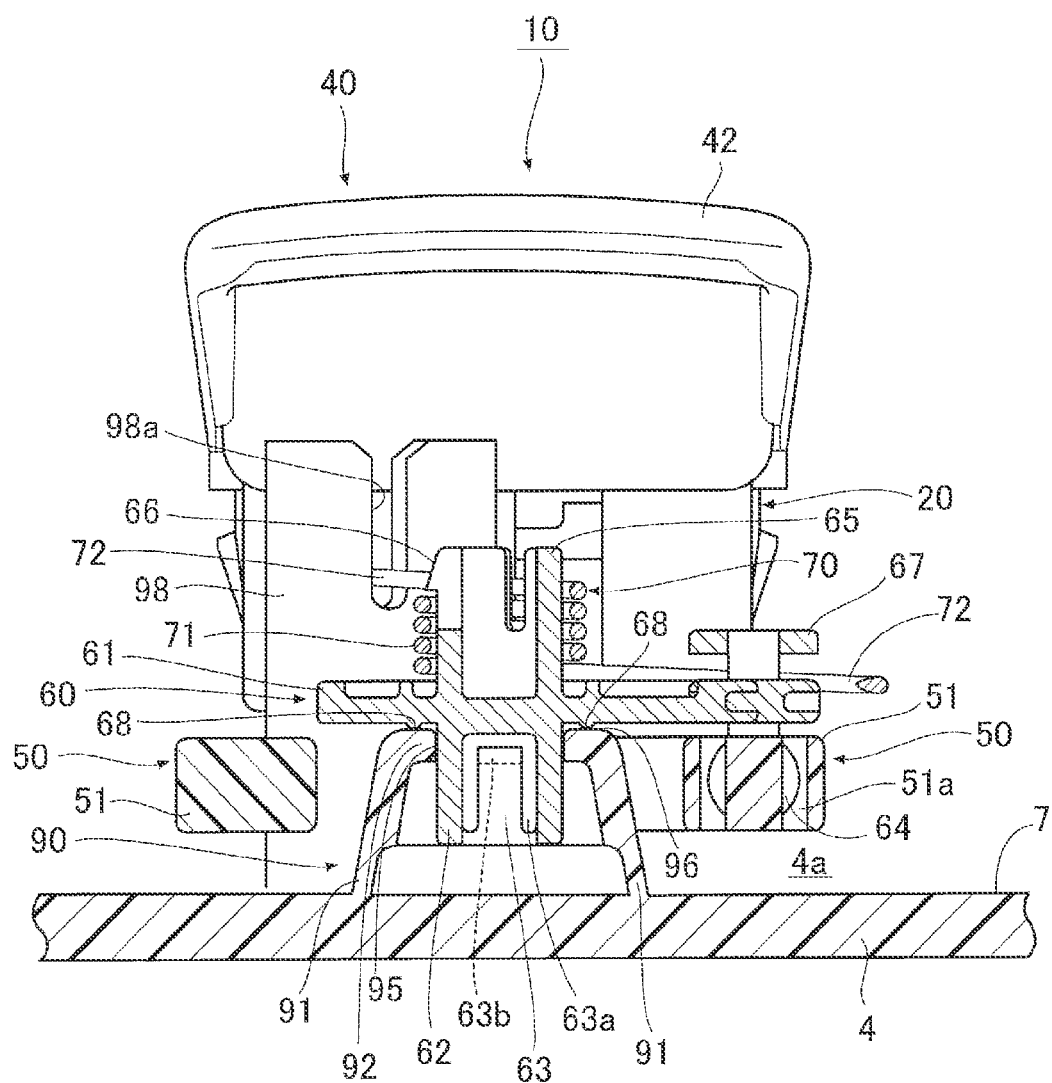
FIG. 11 is a sectional view taken along an A-A arrow of FIG. 10.

As shown in FIGS. 8 and 11, the rotary member attaching part 90 of the present embodiment (hereinbelow, also simply referred to as the "attaching part 90") has a frame shape having upright walls 91 erected from a lock member arrangement surface 7 (hereinbelow, also simply referred to as the "arrangement surface 7") of the opening and closing body 2 facing the lock member 50 and a rotation support wall 92 continuously provided to tip end-sides of the upright wall 91 in an erection direction, arranged spaced from the arrangement surface 7 by a predetermined distance and configured to rotatably support the rotary member 60, and is provided integrally with the opening and closing body 2. Note that, in the present embodiment, the arrangement surface 7 has a flat horizontal surface shape (refer to FIG. 11) but may also have a gently curved concave shape.

More specifically, as shown in FIG. 11, the pair of upright walls 91 and 91 is erected inclined to be gradually closer toward the tip ends in the erection direction from the arrangement surface 7 of the concave portion 4a for lock arrangement of the inner member 4 constituting the opening and closing body 2. Also, as shown in FIG. 8, one side parts of the pair of upright walls 91 and 91 in the width direction (a direction along the arrangement surface 7) are connected by a rear surface wall 93, and tip end portions of the pair of upright walls 91 and 91 and the rear surface wall 93 in the erection direction are connected by the rotation support wall 92, so that a dog house-like frame shape where a front side opposite to the rear surface wall 93 is opened is formed. The rotation support wall 92 is arranged in parallel to a plane direction of the arrangement surface 7 (refer to FIG. 11).

The rotation support wall 92 is formed with a bearing hole 95 having a circular hole shape. Note that, an opening direction of the bearing hole 95 is perpendicular to the plane direction of the arrangement surface 7. As shown in FIG. 11, a rotary shaft 62 (which will be described later) of the rotary member 60 is inserted into the bearing hole 95, so that the rotary member 60 is rotatably supported. A surface of the rotation support wall 92 opposite to the arrangement surface 7 constitutes a seat surface 96 that is in contact with the rotary member 60 to rotatably support the rotary member 60.

Note that, a distance between a rear surface (a surface opposite to the seat surface 96 and facing toward the arrangement surface 7) of the rotation support wall 92 and the arrangement surface 7 is set so that a tip end of the rotary shaft 62 in a protrusion direction is not in contact with the arrangement surface 7 in a state where the rotary shaft 62 is inserted in the bearing hole 95. In the lock device 10, a retainer for preventing the rotary shaft 62 inserted in the bearing hole 95 from coming off is provided between the bearing hole 95 and the rotary shaft 62.

Note that, the rotary member attaching part is not limited to the above structure. For example, the rotary member attaching part may have a substantially L-shaped frame shape having one upright wall erected from the arrangement surface 7 and a rotation support wall bent from a tip end of the upright wall or a substantially U-shaped frame shape having a pair of upright walls and a rotation support wall connecting tip ends of the upright walls where a front side and a rear side are opened, and may have any structure having an upright wall and a rotation support wall by which the rotary member attaching part can be spaced from the lock member arrangement surface by a predetermined distance.

As shown in FIG. 8, a spring engaging wall 98 is erected from the lock member arrangement surface 7 at a position close to the rotary member attaching part 90. The spring engaging wall 98 is formed with an engaging groove 98a, and one arm portion 72 of the first urging portion 70 is engaged with the engaging groove 98a.

Figure 12A:
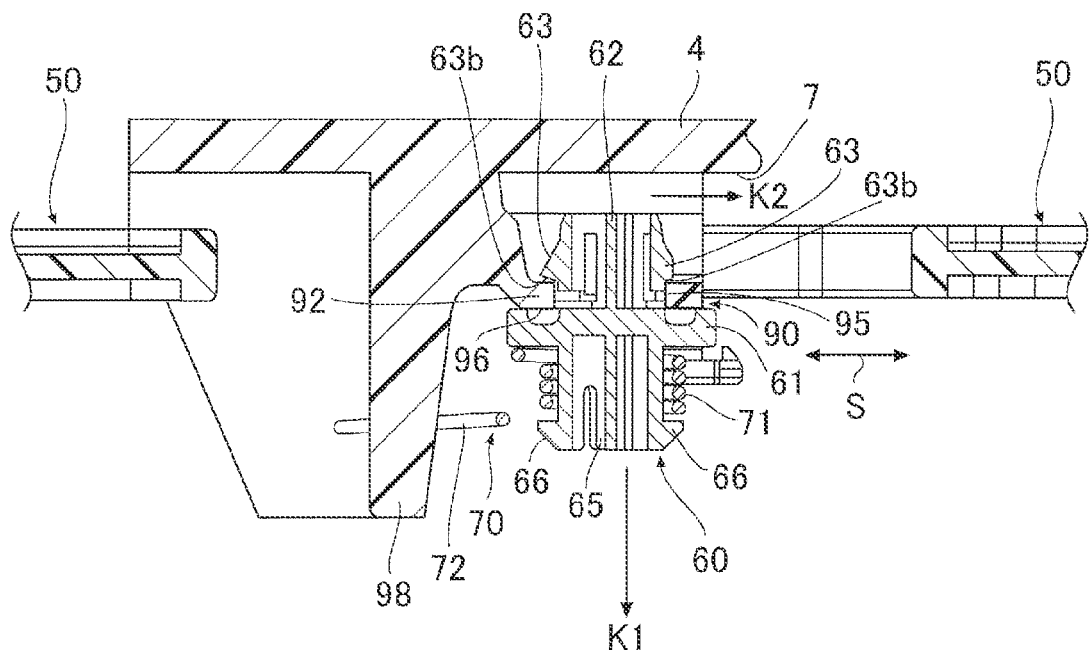
FIG. 12A is a sectional view taken along a B-B arrow of FIG. 10.

Note that, as described above, the attaching part 90 has a dog house-like frame shape having the rotation support wall 92 arranged spaced from the arrangement surface 7 by a predetermined distance. Therefore, as shown in FIG. 12A, when forming an outer periphery shape of the attaching part 90, a demolding direction K1 of a forming mold is orthogonal to the arrangement surface 7, so that the attaching part can be formed integrally with the inner member 4 of the opening and closing body 2. Note that, when forming an inner periphery shape of the attaching part 90, a demolding direction K2 of the forming mold is a direction along the plane direction of the arrangement surface 7.

In the present embodiment, the opening and closing body 2 is provided with the rotary member attaching part 90 and the spring engaging wall 98. However, the fixed body 1 may be provided with the rotary member attaching part and the spring engaging wall.

Subsequently, the rotary member 60 that is rotatably attached to the attaching part 90 is described.

The rotary member 60 has a rotary shaft 62 and lock member connecting portions 64 for rotatably connecting the lock members 50 at positions distant from the rotary shaft 62.

Figure 10:
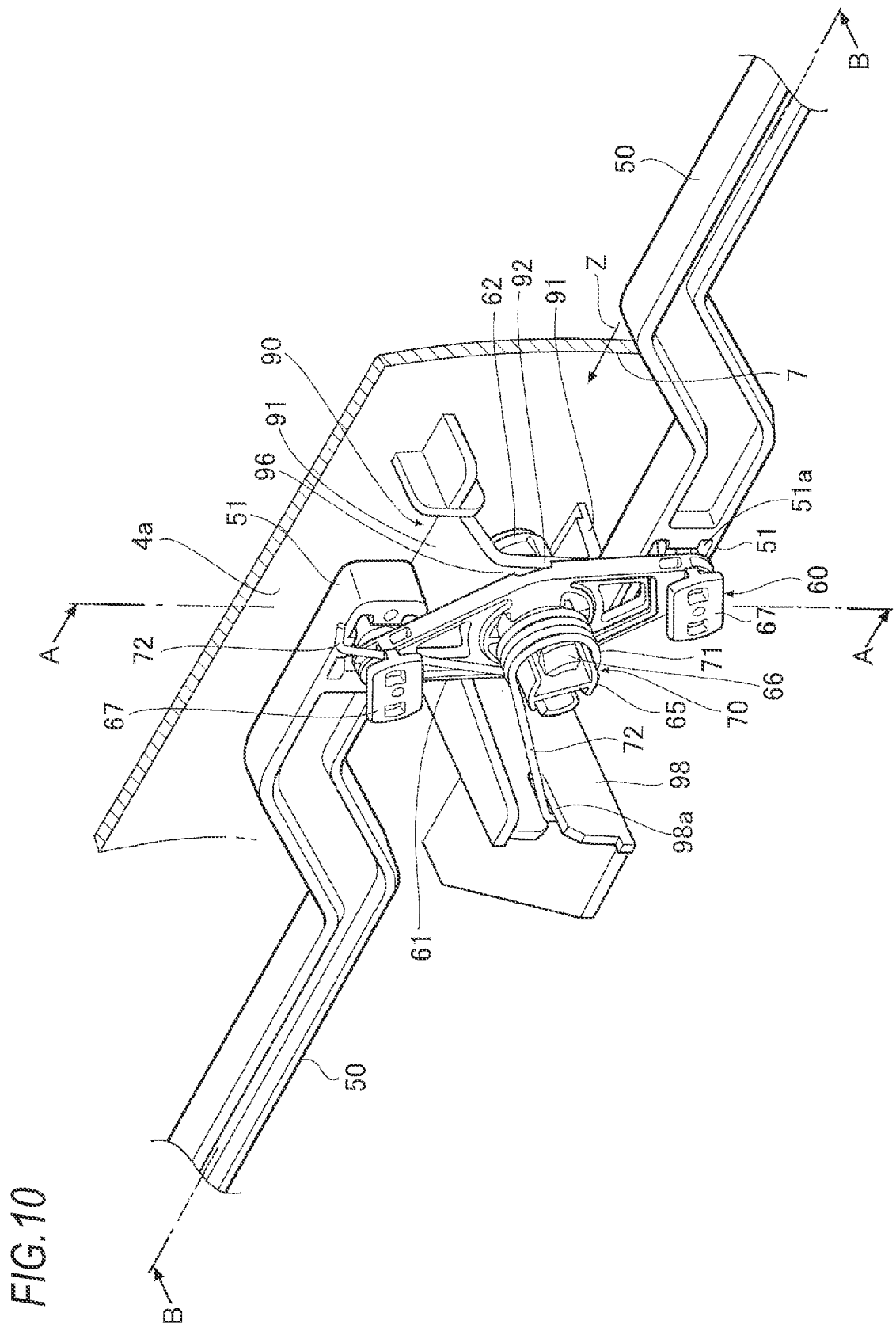
FIG. 10 is an enlarged perspective view depicting a state where the rotary member, the lock member and the like are attached in the lock device.

More specifically, as shown in FIGS. 8 to 10, the rotary member 60 of the present embodiment has a substantially rhombic shape that is horizontally long. The rotary shaft 62 having a substantially cylindrical shape protrudes from a rear side (a side facing toward the arrangement surface 7) at the center of the main body 61 in the longitudinal direction. The rotary shaft 62 is inserted into the bearing hole 95 of the rotation support wall 92 from the seat surface 96-side, so that the main body 61 is arranged on the seat surface 96 of the rotation support wall 92 of the attaching part 90 and the rotary member 60 is rotatably supported by the bearing hole 95, as shown in FIG. 11. A length of the main body 61 in the longitudinal direction is set so that both end portions of the main body 61 in the longitudinal direction protrude beyond outer surfaces of the pair of upright walls 91 and 91 of the attaching part 90 in a state where the rotary shaft 62 is inserted in the bearing hole 95 as described above, as shown in FIG. 10.

Slits 63a and 63a each having a substantially U-shape are formed at places of the rotary shaft 62 facing each other in a circumferential direction, and a pair of engaging portions 63 and 63 is provided so as to be flexibly deformable via the slits 63a and 63a. As shown in FIG. 11, an engaging surface 63b on a tip end-side of the engaging portion 63 is engaged with a peripheral edge of a rear side (a side facing toward the arrangement surface 7) of the bearing hole 95 while keeping a rotating operation of the rotary shaft 62 inserted in the bearing hole 95, thereby preventing the rotary shaft 62 from coming off from the bearing hole 95. That is, in the present embodiment, the bearing hole 95 on the attaching part 90-side and the engaging portion 63 on the rotary member 60-side constitute the "retainer" of the present invention provided between the bearing hole 95 and the rotary shaft 62 and configured to prevent the rotary shaft 62 inserted in the bearing hole 95 from coming off from the bearing hole 95.

Spherical lock member connecting portions 64 and 64 (hereinbelow, also simply referred to as the "connecting portion 64") are provided on rear sides of both end portions of the main body 61 in the longitudinal direction. The connecting portions 64 and 64 protrude in the same direction as the protrusion direction of the rotary shaft 62. Each connecting portion 64 is fitted in the concave portion 51a for fitting of each lock member 50, so that the pair of lock members 50 and 50 is connected to both ends of the main body 61 in the longitudinal direction (refer to FIG. 10).

A first spring support portion 65 on which the wound portion 71 of the first urging portion 70 is externally mounted protrudes from the rotary member 60 in an opposite direction to the extension direction of the rotary shaft 62. Specifically, the first spring support portion 65 having a substantially cylindrical shape on which the wound portion 71 of the first urging portion 70 is externally mounted protrudes coaxially with the rotary shaft 62 from a front side (an opposite side to the rotary shaft 62) at a center of the main body 61 in the longitudinal direction toward the opposite direction to the extension direction of the rotary shaft 62. A pair of spring engaging claws 66 and 66 is formed so as to be flexibly deformable at places of the first spring support portion 65 facing each other in a circumferential direction via a pair of slits 66a and 66a each having a vertical groove shape. The spring engaging claws 66 and 66 are configured to prevent the wound portion 71 of the first urging portion 70 externally mounted on the first spring support portion 65 from separating from the first spring support portion 65 (refer to FIG. 10).

Strip-shaped spring engaging pieces 67 and 67 are provided on front sides of both end portions of the main body 61 in the longitudinal direction. As shown in FIG. 10, one of the spring engaging pieces 67 is engaged with the other arm portion 72 of the first urging portion 70, so that a rotational urging force is applied to the rotary member 60.

As shown in FIG. 9B, a pair of sliding contact protrusions 68 and 68 each having a substantially circular arc protrusion shape protrudes at peripheral edge portions on both sides of the rotary shaft 62 on the rear side of the main body 61. The sliding contact protrusions 68 and 68 are in contact with the seat surface 96, as shown in FIG. 11, in a state where the rotary shaft 62 is inserted in the bearing hole 95 and the engaging surfaces 63b and 63b of the pair of engaging portions 63 and 63 are engaged with the peripheral edge on the rear side of the bearing hole 95. As a result, during rotation of the rotary member 60, since the pair of sliding contact protrusions 68 and 68 is slidingly contacted to the seat surface 96, a contact area between the rear side of the main body 61 and the seat surface 96 is reduced, so that the rotary member 60 can easily rotate.

Note that, the rotary member may have, for example, a disc shape, an elliptical shape, an oval shape or the like and may have a structure having at least the rotary shaft to be inserted in the bearing hole and the lock member connecting portion for connecting the lock member. In the present embodiment, the rotary member attaching part is arranged on the opening and closing body, so that the rotary member is arranged on the opening and closing body-side. However, the rotary member may also be arranged on the fixed body-side.

When attaching the pair of lock members 50 and 50 to the attaching part 90 via the rotary member 60 configured as described above, the pair of connecting portions 64 and 64 of the rotary member 60 are first fitted in the concave portions 51*a* and 51*a* for fitting of the pair of lock members 50 and 50 to connect the base end portions 51 and 51-side of the pair of lock members 50 and 50 to the rotary member 60, as shown in FIG. 8. In this state, the rotary shaft 62 of the rotary member 60 is inserted into the bearing hole 95 of the attaching part 90 from the seat surface 96-side to engage the engaging surfaces 63*b* and 63*b* of the pair of engaging portions 63 and 63 to the peripheral edge on the rear side of the bearing hole 95. Thereby, the main body 61 of the rotary member 60 is rotatably supported on the seat surface 96 of the attaching part 90 via the sliding contact protrusions 68 and 68 and the rotary shaft 62 is prevented from coming off from the bearing hole 95.

In the above state, the base end portions 51 and 51 of the pair of lock members 50 and 50 are arranged on outer sides of the pair of upright walls 91 and 91 of the attaching part 90 (refer to FIGS. 10 and 11). In a state where the base end portions 51 and 51 are connected to the pair of connecting portions 64 and 64 of the rotary member 60, the pair of lock members 50 and 50 is arranged closer to the lock member arrangement surface 7 than the rotation support wall 92 (here, the seat surface 96 of the rotation support wall 92) of the attaching part 90 (refer to FIGS. 10 and 11). Also, as shown in FIG. 11, the engaging surfaces 63*b* and 63*b*, which are to engage with the peripheral edge on the rear side of the bearing hole 95, of the pair of engaging portions 63 and 63 of the rotary member 60 are overlapped with the pair of lock members 50 and 50, when seen from a direction orthogonal to the rotary shaft 62 (i.e., when seen from a direction along the plane direction of the seat surface 96, as shown with an arrow Z in FIG. 8 or 10).

Each connecting portion 64 is fitted and connected to the concave portion 51*a* for fitting of each lock member 50, as described above, so that the base end portions 51 of the pair of lock members 50 and 50 are rotatably connected to both end portions of the rotary member 60 in the longitudinal direction. In addition, as shown in FIGS. 11 and 12A, the rotary shaft 62 is inserted in the bearing hole 95, so that the engaging surfaces 63*b* and 63*b* of the engaging portions 63 and 63 are engaged with the peripheral edge on the rear side of the bearing hole 95 and the rotary member 60 is rotatably held with being prevented from coming off from the attaching part 90. Therefore, when the rotary member 60 is rotated in a predetermined direction, the pair of lock members 50 and 50 is slid in a synchronization manner via the rotary member 60.

In addition, when the first spring support portion 65 of the rotary member 60 is inserted into the wound portion 71 of the first urging portion 70, the wound portion 71 of the first urging portion 70 is externally mounted on the outer periphery of the first spring support portion 65 and the pair of spring engaging claws 66 and 66 is engaged with one end of the wound portion 71 in the axial direction, as shown in FIGS. 10 and 11, so that the wound portion 71 is held with being prevented from coming off from the first spring support portion 65. Then, one arm portion 72 of the first urging portion 70 is inserted and engaged in the engaging groove 98*a* of the spring engaging wall 98 and the other arm portion 72 of the first urging portion 70 is engaged with one spring engaging piece 67. Thereby, as shown with a direction of an arrow E1 in FIG. 15, the rotary member 60 is rotationally urged, so that the tip end portions 52 and 52 of the pair of lock members 50 and 50 connected to the rotary member 60 are urged in a direction of engaging with the pair of lock portions 1*b* and 1*b* (a direction of an arrow E2 in FIG. 15). Note that, as described above, the pair of lock members 50 and 50 is slidably arranged in the concave portion 4*a* for lock arrangement of the inner member 4 constituting the opening and closing body 2. However, the tip end portions 52 and 52 are inserted from the holes 4*b* and 4*b* for lock insertion and extraction formed in the concave portion 4*a* for lock arrangement.

As shown with the dashed-two dotted line in FIG. 7 and in FIG. 14, when the gripping part 42 of the operation member 40 is rotated in a direction of separating from the base member 20, the operating lever 45 presses an inner surface of the frame-shaped part 53 of one lock member 50, thereby pulling the tip end portion 52 of one lock member 50 in a direction of not engaging with the lock portion 1*b* against the urging force of the first urging portion 70 and pulling the tip end portion 52 of the other lock member 50 in a direction of not engaging with the lock portion 1*b* via the rotary member 60 in association (synchronization) with the pulling. Thereby, the locked state of the opening and closing body 2 that closes the opening portion 1*a* of the fixed body 1 can be released.

Note that, in the present embodiment, a slide direction S of the pair of lock members 50 and 50 is a direction along the plane direction of the arrangement surface 7, as shown in FIG. 12A. Also, in the present embodiment, when the operation member 40 is rotationally operated as described above, one lock member 50 is slid and the other lock member 50 is slid via the rotary member 60. However, the rotary member 60 may be rotated by the rotation operation of the operation member 40, thereby sliding the lock member 50.

Subsequently, the operational effects of the lock device 10 configured as described above are described.

In the lock device 10, the attaching part 90 to which the rotary member 60 is rotatably attached has the pair of upright walls 91 and 91 erected from the arrangement surface 7 of the opening and closing body 2 and the rotation support wall 92 continuously provided to the upright walls 91 and arranged spaced from the arrangement surface 7 by a predetermined distance, and is provided integrally with the opening and closing body 2, as shown in FIGS. 8 and 11. For this reason, as described above, the rotary shaft 62 of the rotary member 60 to which the base end portions 51 and 51 of the pair of lock members 50 and 50 are rotatably connected is inserted in the bearing hole 95 of the attaching part 90 to engage the engaging surfaces 63*b* and 63*b* of the engaging portions 63 and 63 to the peripheral edge on the rear side of the bearing hole 95, so that the rotary member 60 can be rotatably attached to the attaching part 90. Therefore, as compared to a configuration where the rotary member 60 is fixed to a boss or the like provided to the opening and closing body 2 by a screw, for example, it is possible to reduce the number of components and to improve the attachment operability.

The rotation support wall 92 configured to rotatably support the rotary member 60 is continuously provided to the upright walls 91 and is arranged spaced from the arrangement surface 7 by a predetermined distance. Therefore, during integral molding of the opening and closing body 2 and the attaching part 90, when demolding a forming mold, it is possible to easily set an angle of the seat surface 96 relative to the arrangement surface 7 to a desired angle.

Figure 12B:
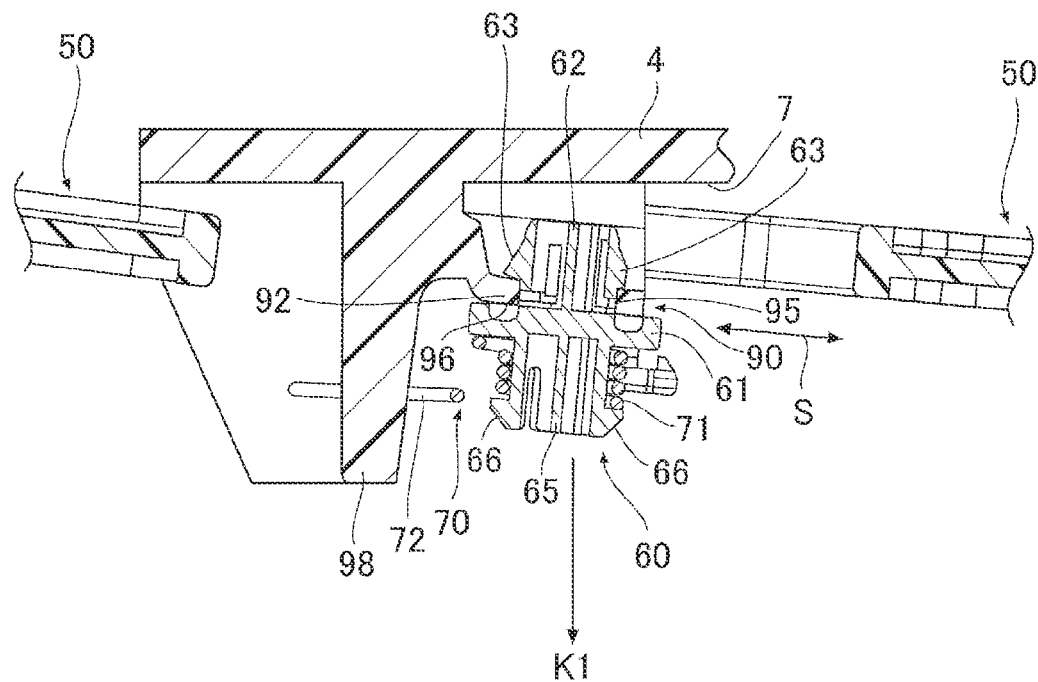
FIG. 12B is a sectional view depicting a state where a rotation support wall is inclined relative to a lock member arrangement surface by a predetermined angle, with respect to FIG. 12A.

That is, as shown in FIG. 12B, even though the rotation support wall 92 is inclined relative to the arrangement surface 7 by a predetermined angle, the demolding direction K1 of the forming mold when forming an outer periphery shape of the attaching part 90 can be set to be the same as the demolding direction K1 shown in FIG. 12A. Therefore, it is possible to cope with the inclination of the rotation support wall 92 simply by changing a cavity shape of the forming mold (note that, in a case of a tubular boss erected from the arrangement surface 7, when changing an angle of the boss, it is necessary to change a demolding direction of the forming mold, which is a major change). As a result, it is possible to set the slide direction S (stroke direction) of the lock member 50 connected to the connecting portion 64 of the rotary member 60 to an angle inclined relative to the arrangement surface 7, as shown in FIG. 12B, so that it is possible to easily adjust the slide direction of the lock member 50.

In the lock device 10, when the opening and closing body 2 is closed from a state where the opening and closing body 2 is opened from the opening portion 1a of the fixed body 1, the tip end portions 52 and 52 of the pair of lock members 50 and 50 are engaged with the lock portions 1b and 1b of the fixed body 1, so that the opening and closing body 2 is locked in a closed state (refer to FIGS. 13 and 15).

Figure 16:
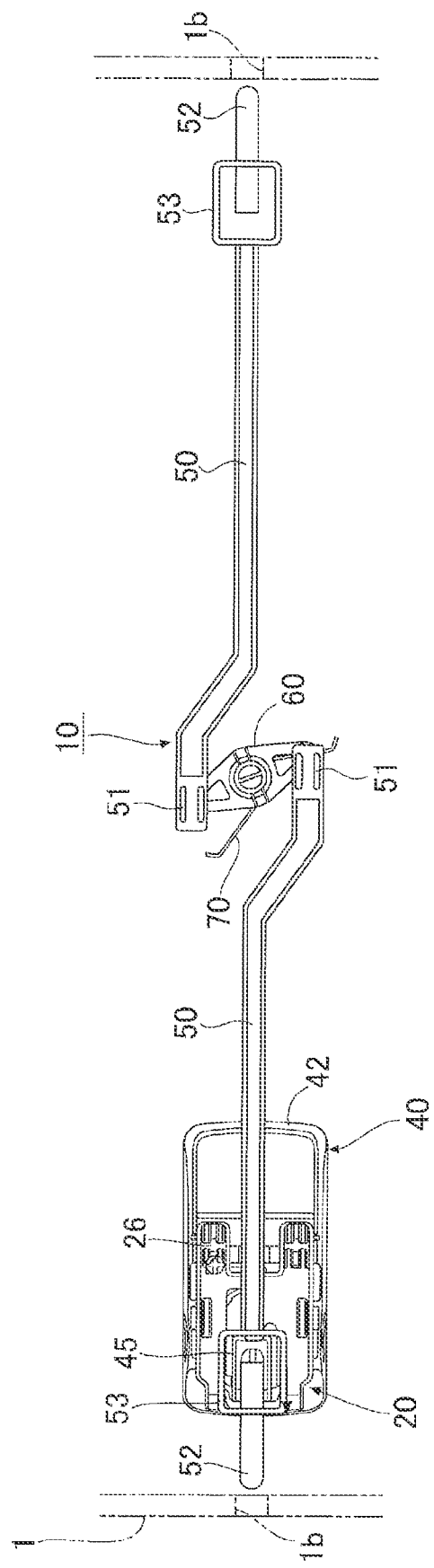
FIG. 16 is a front view depicting the case where the locked state of the opening and closing body is released in the lock device.

From this state, when the gripping part 42 of the operation member 40 is rotated in a direction of separating from the base member 20, as shown with the dashed-two dotted line in FIG. 7 or in FIG. 14, the tip end portion 52 of one lock member 50 is pulled in a direction of not engaging with the lock portion 1b against the rotational urging force of the rotary member 60 and the tip end portion 52 of the other lock member 50 is pulled in a direction of not engaging with the lock portion 1b via the rotary member 60 in association with the pulling, as shown in FIG. 16. Therefore, the locked state of the opening and closing body 2 is released, so that the opening and closing body 2 can be opened from the opening portion 1a of the fixed body 1.

In the present embodiment, as shown in FIGS. 8 and 10, the lock member 50 is constituted by a pair of members, the pair of connecting portions 64 is provided to the rotary member 60, and the pair of lock members 50 and 50 is connected to the pair of connecting portions 64 and 64 so as to be located on both sides of the attaching part 90. In this way, since the pair of lock members 50 and 50 is connected to the pair of connecting portions 64 and 64 so as to be located on both sides of the attaching part 90 (here, on the outer sides of the pair of upright walls 91 and 91), the pair of lock members 50 and 50 can be arranged close to the arrangement surface 7 with being overlapped with the attaching part 90 in a height direction, as shown in FIG. 11, so that it is possible to thin parts of the lock device 10 where the lock member 50 and the rotary member 60 are arranged.

In the present embodiment, as shown in FIG. 11, the pair of lock members 50 and 50 is arranged closer to the arrangement surface 7 than the rotation support wall 92 of the attaching part 90 in a state where the base end portions 51 and 51 are connected to the pair of connecting portions 64 and 64 of the rotary member 60. For this reason, since a distance of the rotary shaft 62 of the rotary member 60 inserted in the bearing hole 95 of the attaching part 90 from the arrangement surface 7 and a distance of the base end portion 51 of the lock member 50 rotatably supported to the rotary member 60 from the arrangement surface 7 can be made close to each other, an axial eccentric load applied to the rotary shaft 62 can be reduced, so that the rotary member 60 can be smoothly rotated.

In the present embodiment, the retainer for preventing the rotary shaft 62 inserted in the bearing hole 95 from coming off from the bearing hole 95 is constituted by the bearing hole 95 and the engaging portion 63 provided to the rotary shaft 62 and configured to engage with the peripheral edge on the rear side of the bearing hole 95 while keeping the rotating operation of the rotary shaft 62, and the engaging surface 63b of the engaging portion 63 to engage with the peripheral edge on the rear side of the bearing hole 95 is configured to overlap the lock member 50, as seen from a direction orthogonal to the rotary shaft 62, as shown in FIG. 11. In this way, at the position at which the engaging surface 63b on which the engaging portion 63 of the rotary shaft 62 is engaged with the peripheral edge on the rear side of the bearing hole 95 and the lock member 50 are overlapped, as seen from the direction orthogonal to the rotary shaft 62, the axial eccentric load applied to the rotary shaft 62 can be further reduced and the rotary member 60 can be thus further smoothly rotated.

In the present embodiment, the first urging portion 70 is the torsion spring having the wound portion 71 and the pair of arm portions 72 and 72 extending from the wound portion 71 (refer to FIG. 8), and as shown in FIGS. 8 and 10, the first spring support portion 65 on which the wound portion 71 is externally mounted protrudes from the rotary member 60 in the opposite direction to the extension direction of the rotary shaft 62. For this reason, as shown in FIG. 10, since the base end portions 51 and 51 of the pair of lock members 50 and 50 can be arranged close to each other on the opposite side to the mounting side of the torsion spring with respect to the rotary member 60, it is possible to make the lock device 10 compact.

The present invention is not limited to the above embodiment. A variety of modified embodiments can be made within the scope of the gist of the present invention, and such modified embodiments are also included in the scope of the present invention.

REFERENCE SIGNS LIST

1: fixed body
1a: opening portion
1b: lock portion
2: opening and closing body
7: lock member arrangement surface (arrangement surface)
10: lock device for an opening and closing body (lock device)
20: base member
40: operation member
50: lock member
60: rotary member
62: rotary shaft
63: engaging portion
63b: engaging surface
63: lock member connecting portion (connecting portion)
65: first spring support portion
70: first urging portion (urging portion)
71: wound portion
72: arm portion
75: second urging portion
80: key cylinder
90: rotary member attaching part (attaching part)
91, 91: upright wall
92: rotation support wall
95: bearing hole

The invention claimed is:

1. A lock device for an opening and closing body that is attached to an opening portion of a fixed body in an openable and closable manner, the lock device comprising:
   a lock portion provided on the opening portion of the fixed body or the opening and closing body;
   a lock member slidably arranged to the opening and closing body or the fixed body and configured to be engaged with or disengaged from the lock portion; and
   a rotary member rotatably attached to the opening and closing body or the fixed body via a rotary member attaching part, wherein
   the rotary member includes a rotary shaft, a main body protruding in a radial direction of the rotary shaft, and a lock member connecting portion formed at the main body and rotatably connected to the lock member,
   the rotary member attaching part includes an upright wall erected from a lock member arrangement surface, which is a surface of the opening and closing body or the fixed body facing the lock member, and a rotation support wall continuously provided to the upright wall and arranged spaced from the lock member arrangement surface by a predetermined distance, and is provided integrally with the opening and closing body or the fixed body,
   the rotation support wall is formed with a bearing hole in which the rotary shaft is inserted,
   a retainer preventing the rotary shaft inserted in the bearing hole from coming off is provided between the bearing hole and the rotary shaft, and
   the lock member is arranged between the main body and the lock member arrangement surface in a state where the lock member is connected to the lock member connecting portion.

2. The lock device for an opening and closing body according to claim 1, wherein
   the lock member is provided in a pair,
   the lock member connecting portion is provided in a pair to the rotary member, and
   the pair of lock members are connected to the pair of lock member connecting portions so as to be located on both sides of the rotary member attaching part.

3. The lock device for an opening and closing body according to claim 2, wherein
   the pair of lock members are arranged closer to the lock member arrangement surface than the rotation support wall in a state where the pair of lock members are connected to the pair of lock member connecting portions.

4. The lock device for an opening and closing body according to claim 2, wherein
   the retainer includes the bearing hole and an engaging portion provided to the rotary shaft and configured to engage with a peripheral edge of a rear side of the bearing hole while keeping a rotating operation of the rotary shaft, and
   an engaging surface of the engaging portion to engage with the peripheral edge of the rear side of the bearing hole is located overlapped with the lock member, as seen from a direction orthogonal to the rotary shaft.

5. The lock device for an opening and closing body according to claim 1, further comprising an urging portion urging the lock member in a direction of engaging with the lock portion, wherein
   the urging portion is a torsion spring having a wound portion and a pair of arm portions extending from the wound portion, and
   a first spring support portion on which the wound portion is externally mounted protrudes from the rotary member in an opposite direction to an extension direction of the rotary shaft.

6. The lock device for an opening and closing body according to claim 1, wherein
   the lock member connecting portion includes a protrusion protruding from the main body toward the lock member arrangement surface,
   a concave portion for fitting is formed at the lock member, and
   the protrusion of the lock member connecting portion is fitted in the concave portion of the lock member so that the lock member is connected to the rotary member.

* * * * *